(12) United States Patent
Etoh et al.

(10) Patent No.: US 7,292,632 B2
(45) Date of Patent: Nov. 6, 2007

(54) METHOD AND APPARATUS FOR TRANSFORMING MOVING PICTURE CODING SYSTEM

(75) Inventors: Minoru Etoh, Kawasaki (JP); Tsutomu Uenoyama, Kawasaki (JP); Osamu Iwasaki, Tokyo (JP); Daisaku Komiya, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 815 days.

(21) Appl. No.: 10/456,677

(22) Filed: Jun. 9, 2003

(65) Prior Publication Data

US 2003/0215012 A1    Nov. 20, 2003

Related U.S. Application Data

(62) Division of application No. 09/511,488, filed on Feb. 23, 2000, now Pat. No. 6,625,211.

(30) Foreign Application Priority Data

Feb. 25, 1999   (JP)   ................. 11-047613

(51) Int. Cl.
   *H04N 7/12*      (2006.01)
   *H04N 11/02*     (2006.01)
   *H04N 11/04*     (2006.01)
   *H04B 1/66*      (2006.01)

(52) U.S. Cl. ................................. 375/240.01

(58) Field of Classification Search ..............
   375/240.02–240.07, 240.12–240.16, 240.24, 375/346; *H04N 7/12*
   See application file for complete search history.

(56) References Cited

U.S. PATENT DOCUMENTS 5,544,266 A   8/1996   Koppelmens et al.

(Continued)

FOREIGN PATENT DOCUMENTS

EP    0711077    5/1996

(Continued)

OTHER PUBLICATIONS

J.-N. Hwang et al., "Dynamic Frame-Skipping in Video Transcoding," Multimedia Signal Processing, 1998 IEEE Second Workshop on Redondo Beach, CA, USA, Dec. 7, 1998, pp. 616-621.

(Continued)

*Primary Examiner*—Nhon Diep
(74) *Attorney, Agent, or Firm*—Greenblum & Bernstein, P.L.C.

(57) ABSTRACT

A first data sequence generated by a first moving picture coding system having an intra-frame coding mode and an inter-frame coding mode is transformed to a second data sequence generated by a second moving picture coding system having an intra-frame coding mode and an inter-frame coding mode. The method includes prereading a coding mode of a successive frame succeeding a present frame from the first data sequence, judging whether or not a preread coding mode of the successive frame is the intra-frame coding mode and determining whether or not to code the present frame by the second moving picture coding system corresponding to a generated code amount of the second data sequence when the coding mode of the successive frame is the intra-frame coding mode. Data coded by the intra-frame coding mode existing in the first data sequence is transformed to the second data sequence.

15 Claims, 16 Drawing Sheets

U.S. PATENT DOCUMENTS

| | | | |
|---|---|---|---|
| 5,623,312 | A | 4/1997 | Yan et al. |
| 5,640,208 | A * | 6/1997 | Fujinami ............... 375/240.14 |
| 5,724,100 | A * | 3/1998 | Kuchibhotla ........... 375/240.24 |
| 5,929,916 | A * | 7/1999 | Legall et al. .......... 375/240.05 |
| 5,940,130 | A | 8/1999 | Nilsson et al. |
| 6,005,623 | A | 12/1999 | Takahashi et al. |
| 6,081,295 | A | 6/2000 | Adolph et al. |
| 6,167,088 | A | 12/2000 | Sethuraman |
| 6,310,915 | B1 * | 10/2001 | Wells et al. ........... 375/240.03 |
| 2002/0172283 | A1 * | 11/2002 | Kawakatsu et al. .... 375/240.13 |
| 2003/0206588 | A1 | 11/2003 | Etoh et al. |
| 2004/0091068 | A1 * | 5/2004 | Jokimies et al. ............ 375/346 |

FOREIGN PATENT DOCUMENTS

| | | |
|---|---|---|
| JP | 10271494 | 10/1998 |
| WO | 98/19460 | 5/1998 |

OTHER PUBLICATIONS

J.-N. Hwang et al., "Motion Vector Re-estimation and Dynamic Frame-Skipping for Video Transcoding," Signals, Systems & Computers, 1998, Conference Record of the Thirty-second Asilomar Conference on Pacific Grove, CA, USA, Nov. 1, 1998, pp. 1606-1610.

N. Bjork et al., "Transcoder Architectures for Video Coding," IEEE Transactions on Consumer Electronics, vol. 44, No. 1, Feb. 1998, pp. 88-98.

J. Youn et al., "Adaptive Motion Vector Refinement for High Performance Transcoding," Image Processing, 1998, ICIP 98 Proceedings, 1998 International Conference on Chicago, IL, USA, Oct. 4-7, 1998, pp. 596-600.

P. A. A. Assunacao, "A Buffer Control Algorithm for CBR Video Transcoding," Image Processing, 1998, ICIP 98 Proceedings, 1998 International Conference on Chicago, IL, USA, Oct. 4-7, 1998, pp. 370-374.

English Language Abstract of JP Appln. No. 10-271494.

* cited by examiner

THE TOTAL NUMBER OF MACRO BLOCKS IS 99 IN EMBODIMENT (SMALLER THAN 132; INTRA-REFRESHING PERIOD UPPER LIMIT)

METHOD AND APPARATUS FOR TRANSFORMING MOVING PICTURE CODING SYSTEM

CROSS-REFERENCE TO RELATED APPLICATIONS

This is a divisional of U.S. application Ser. No. 09/511,488, filed Feb. 23, 2000 now U.S. Pat. No. 6,625,211, the entire disclosure of which is expressly incorporated by reference herein in its entirety.

BACKGROUND OF THE INVENTION

1. Field of the Invention

The present invention relates to a method and apparatus for transforming a moving picture coded by a coding system into another moving picture coded by another coding system.

2. Description of the Related Art

With the progress of multimedia techniques for handling voice, image and other data collectively, conventional information media such as a newspaper, magazine, television, radio, and telephone, which are means for conveying information to people, become subjects for the multimedia.

Generally, the multimedia are considered to show not only characters but also other information such as figures, voices, or particularly images, associated with characters at the same time. In order to make the above-mentioned conventional information media the subjects for the multimedia, representing the conventional information in digital format is the essential condition.

However, the estimation of the code amount of each of the conventional information media in digital format results in 64 kb per second for voices (telephone quality) and equal to or more than 100 Mb per second for moving pictures (current television reception quality), while the code amount for a character is 1 to 2 bytes. Therefore, it is not realistic to handle such a massive code amount in digital format without using any transformation.

For example, a video teleconferencing system is already put to practical use with an Integrated Services Digital Networks (ISDN) with a transmission rate of 64 kbps to 1.5 Mbps, it is however impossible to transmit images for a television or camera directly without the transformation with the ISDN.

A data compression technique is consequently required. For example, the video teleconferencing system uses moving picture compression techniques of the H.261 standard and H.263 standard that are international-standardized by the ITU-T (Telecommunication Standardization Sector of International Telecommunication Union).

Further, according to the information compression technique of the MPEG standard, ordinary television broadcast moving picture is compressed to 2 to 15 Mbps.

Herein, the MPEG (Moving Picture Experts Group) means the operation group (ISO/IEC JTC1/SC29/WG11) working for the standardization of speech and moving picture coding in the ISO (International Organization for Standardization), and also means the international standardization of the data compression that this group defines, at the same time. Currently, the MPEG has standardized MPEG-4 enabling the coding and processing by an object basis to achieve the new function needed for the multimedia technique.

A plurality of moving picture coding standards are thus to be used, resulting in the problem to be solved that coded data (hereinafter referred to as bit-stream) in such standards is not compatible with each other.

For example, although a decoder based on MPEG-4 is specified to be capable of decoding H.263 bit-stream, there is generally no compatibility of bit-stream between coding systems of H.261, H.263, MPEG-2 and MPEG-4 (in other words, it is not possible to use a coder and decoder based on different coding systems as a pair).

This condition requires an apparatus that transforms bit-streams based on the different coding systems (hereinafter referred to as transcoder).

FIG. 1 illustrates a conceptual diagram of the transcoder. In FIG. 1, different coding systems are A and B, decoder 101 with a system A and coder 103 with a system B are connected through a frame memory and image transformer 102.

For example, it is assumed that the system A is MPEG-2 (picture size: 704×480 pixels), and that the system B is H.263 (picture size: 360×288 pixels). Although the picture sizes thereof are different from each other, it is possible to perform the transformation by once transforming the bit-stream to an image, and then coding the image again.

In addition, the H.261, H.263, MPEG-2 and MPEG-4 coding systems use Motion-Compensated Discrete Cosine Transformation coding system (hereinafter referred to as MC-DCT coding) as a common method. In the MC-DCT coding system, an image is divided into blocks each of which is called a micro block comprised of 16×16 pixels, a shifted amount (motion vector) that minimizes a differential between successive images (frames) is calculated, and the differential is subjected to Discrete Cosine Transform (DCT) coding.

The processing to obtain the motion vector that minimizes the differential between the frames to obtain a differential image from which the redundancy is removed is called motion compensation.

DCT is used to remove spatial redundancy left in the motion-compensated image (differential image).

In addition, a first frame is coded using only DCT because the differential coding with another frame is not performed. Such a frame is called I picture, and other general picture to be subjected to MC-DCT coding is called P picture.

If the MC-DCT coding system as described above is used in the coding systems A and B, it is possible in decoding in FIG. 1 to obtain secondary information (hereinafter referred to as side information) generated in the MC-DCT coding such as moved information and DCT coefficient quantization, and it is expected that the use of the side information improves the computation efficiency and coding efficiency (image quality and coded content) in recoding.

A conventional example of the transcoder using the side information is a moving picture coding transformation apparatus disclosed in Japan Unexamined Patent Publication HEI10-271494.

FIG. 2 illustrates the concept of the apparatus.

When it is assumed that the systems A and B in the transcoder illustrated in FIG. 1 are respectively MPEG-2 and H.263, a configuration of 101 to 103 in FIG. 1 corresponds to that of 202 to 204 in FIG. 2.

In the conventional example, since the two coding systems have the MC-DCT coding system as the common method, it is possible to omit motion vector searching in H.263 coding by executing scaling (transforming an absolute value by multiplying a ratio of picture sizes) on the motion vector obtained in MPEG-2 decoding.

In the conventional example illustrated in FIG. 2, with the motion vector adopted as the side information, the computation efficiency in recoding is improved using the side information obtained in MPEG-2 decoding.

In composing a practical transcoder, however, there are many subjects to be examined other than the reuse of motion vector.

In the practical coder, a process called rate control is inevitable to adjust the code amount of bit-streams output therefrom.

Generally, an output buffer is installed at an output side to absorb a variation of generated code amount, and corresponding to the buffering data in the output buffer (hereinafter referred to as buffer loaded code amount), the coded content is adjusted.

In the MC-DCT coding system, the coded content adjustment is executed by setting the quantization accuracy for the DCT coefficient to variable (fine accuracy improves the image quality and increases the generated code amount, while rough accuracy results in the opposite effects).

FIG. 3 illustrates a conceptual diagram showing subjects for the transcoder.

An output terminal of output buffer 304 is connected to a communication path or storage medium. When it is assumed that the communication path has a fixed data rate, the bit-stream is output from the output buffer with the constant rate. Coder 303 with the system B adjusts the generated code amount so that data in buffer 304 is not consumed (underflow) or not excessive (overflow). Meanwhile, in order to improve the recoded image quality, it is necessary to use the side information concerning coding procedure such as quantization and coding mode. Generally speaking, when a coder with the system B is operated independently of the coding procedure of the system A, an image quality loss generated by the system B is added to the image quality loss generated by the system A.

For example, it is assumed that the bit-stream of the system A is coded at a rate of 10 frames/sec. When the reproduced result is recoded by the system B independently at a rate of 15 frames/sec, a frame with the system B of which the coding time accords that with the system A is one frame in three frames. In other words, the decoding intervals of other two frames do not accord with the original moving picture. Therefore, despite the frame rate being increased, the decoding result by the system B may not maintain, or even decrease the image quality of the system A.

The same phenomenon occurs in the quantization of DCT coefficient. It is assumed that the quantization in the system A is executed by rounding with ½. In order to prevent the generation of accumulated errors due to requantization, it is the most preferable that the quantization in the system B is also set to ½, to obtain a symmetry coded content. The frame rate conversion, requantization of DCT coefficient and picture size conversion are processing all to execute "requantization", in the broad sense, of moving pictures. For the requantization, it is preferable to operate coder 303 with the system B depending on decoder 301 with the system A in FIG. 3.

As described above, in order to execute the rate control, it is preferable to operate coder 303 with the system B independently of decoder 301 to enable the control of requantization, while observing the loaded content in output buffer 304. On the other hand, in order to reduce image quality deterioration by the broad-sense requantization, it is preferable to operate coder 303 with the system B depending on decoder 301 with the system A. However, the conventional techniques concerning the transcoder is developed from a point of view to improve the computation efficiency by using the side information, for example, recoding by motion vector scaling, and a technique is not disclosed that achieves both rate control and suppression of image quality deterioration due to requantization.

SUMMARY OF THE INVENTION

In view of the forgoing, an object of the present invention is to provide a method and apparatus for performing a rate control while suppressing image quality deterioration in transforming a moving picture coding system.

A first aspect of the present invention is a method and apparatus for transforming, sequentially from a head of data, a first data sequence generated by a first moving picture coding system comprised of an intra-frame coding mode and inter-frame coding mode to a second data sequence generated by a second moving picture coding system comprised of the intra-frame coding mode and inter-frame coding mode, and the method and apparatus 1. read data of a frame from the first data sequence, and further preread a coding mode of a successive frame; and
2. decides whether the present frame should be coding or not for decrease a generated code amount, corresponding to a generated code amount of the second data sequence transformed to the second moving picture coding system in the case where the preread coding mode of the successive frame is the intra-frame coding mode. Then the data coded by the intra-frame coding mode existing in the first data sequence is preferentially transformed to the second data sequence.

According to such method and apparatus, it is possible to perform stable coding which does not cause the overflow in coding an 'I' frame, by prereading the coding mode of the successive frame, and controlling the coded content of the present frame corresponding the coding mode of the successive frame and the coded content generated in the system transformation.

A second aspect of the present invention is a method and apparatus for transforming a first data sequence generated by a first moving picture coding system to a second data sequence generated by a second moving picture coding system, while transforming a frame or a picture portion obtained by dividing a frame on a coding-unit basis sequentially from a head of data, and the apparatus and method 1. record a code amount of the coding-unit in reading data of the coding-unit from the first data sequence, and
2. set a target value of the generated code amount of the second data sequence at a value obtained by multiplying the recorded code amount by a predetermined factor in transforming the data of the coding-unit to that of the second moving picture coding system, and then control a rate so that a ratio of code amounts, on a coding-unit basis, of data composing said first data sequence comes close to a ratio of code amounts, on the coding-unit basis, of data composing said second data sequence.

According such method and apparatus, it is possible to perform the recoding faithful to original rate control, and to suppress image quality deterioration due to errors accumulated by requantization, by recording the code amount of a frame of original image data, and setting the target value of the generated code amount of the second data sequence at the value obtained by multiplying the recorded code amount by the predetermined factor in transforming the data in the second moving picture coding system.

A third aspect of the present invention is a method and apparatus for transforming, sequentially from a head of data, a first data sequence generated by a first moving picture coding system that switches an intra-frame coding mode and inter-frame coding mode on a block-by-block basis to a second data sequence generated by a second moving picture coding system that switches the intra-frame coding mode and inter-frame coding mode on the block-by-block basis, and the method and apparatus select the intra-frame coding mode more in the second moving picture coding system than in the first moving picture coding system in the case where a generated code amount of the second data sequence does not reach a target value.

According to such method and apparatus, the capacity of an output buffer is adjusted by inserting the intra-frame coding mode when the capacity left in the output buffer is relatively large. It is thus possible to perform rate control without changing quantization characteristics, and to suppress image quality deterioration caused by requantization.

A fourth aspect of the present invention is a method and apparatus for transforming, sequentially from a head of data, a first data sequence generated by a first moving picture coding system that switches an intra-frame coding mode and inter-frame coding mode on a block-by-block basis to a second data sequence generated by a second moving picture coding system that switches the intra-frame coding mode and the inter-frame coding mode on the block-by-block basis, and the method and apparatus select the inter-frame coding mode more in the second moving picture coding system than in the first moving picture coding system in the case where a generated code amount of the second data sequence exceeds a target value.

According to such method and apparatus, the capacity of an output buffer is adjusted by inserting the inter-frame coding mode when the capacity left in the output buffer is relatively small. It is thus possible to perform rate control without changing quantization characteristics, and to suppress image quality deterioration caused by requantization.

A fifth aspect of the present invention is a method and apparatus for sequentially transforming a first data sequence generated by a first unlossless moving picture coding system with an information loss caused by quantization to a second data sequence caused by a second unlossless moving picture coding system with an data loss generated by quantization, and the method and apparatus:

1. record a quantization scale in reading data from the first data sequence; and
2. change a quantization scale to integral times the acquired quantization scale in adjusting the generated code amount of the second data sequence.

According to such method and apparatus, it is possible to suppress image quality deterioration caused by requantization, by changing the quantization scale by integral times when the rate control is performed by changing the quantization scale.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

The embodiments describe the case that a bit-stream coded in the moving picture coding system based on ITU-T Recommendation H.216 is transformed to the bit-stream in the moving picture coding system based on the MPEG-4 standard, and another case that the opposite transformation is performed. Both systems are representative coding systems performed based on the MC-DCT system, and the details thereof are respectively described in an ITU-T Recommendation H.261 document (H.261 Recommendation, LINE TRANSMISSION OF NON-TELEPHONE SIGNALS 03/1993) and in an ISO standardization document (Document Number ISO/IEC JTC1/SC29/WG11 N2502 Document Name INFORMATION TECHNOLOGY-GENERIC CODING OF AUDIO-VISUAL OBJECTS Part 2:Visual ISO/IEC 14496-2, published 10/1998. Further, used as a reference of operations of H.261 coder that is not specified in the standardization is CCITT (currently ITU-T) SG15 Working Party 15/4, Specialists Group on Coding for Visual Telephony Document 525, Description of Ref. Model8 (RM8), June, 1989.

The data structure in the H.261 standard is first explained.

Figure 4:
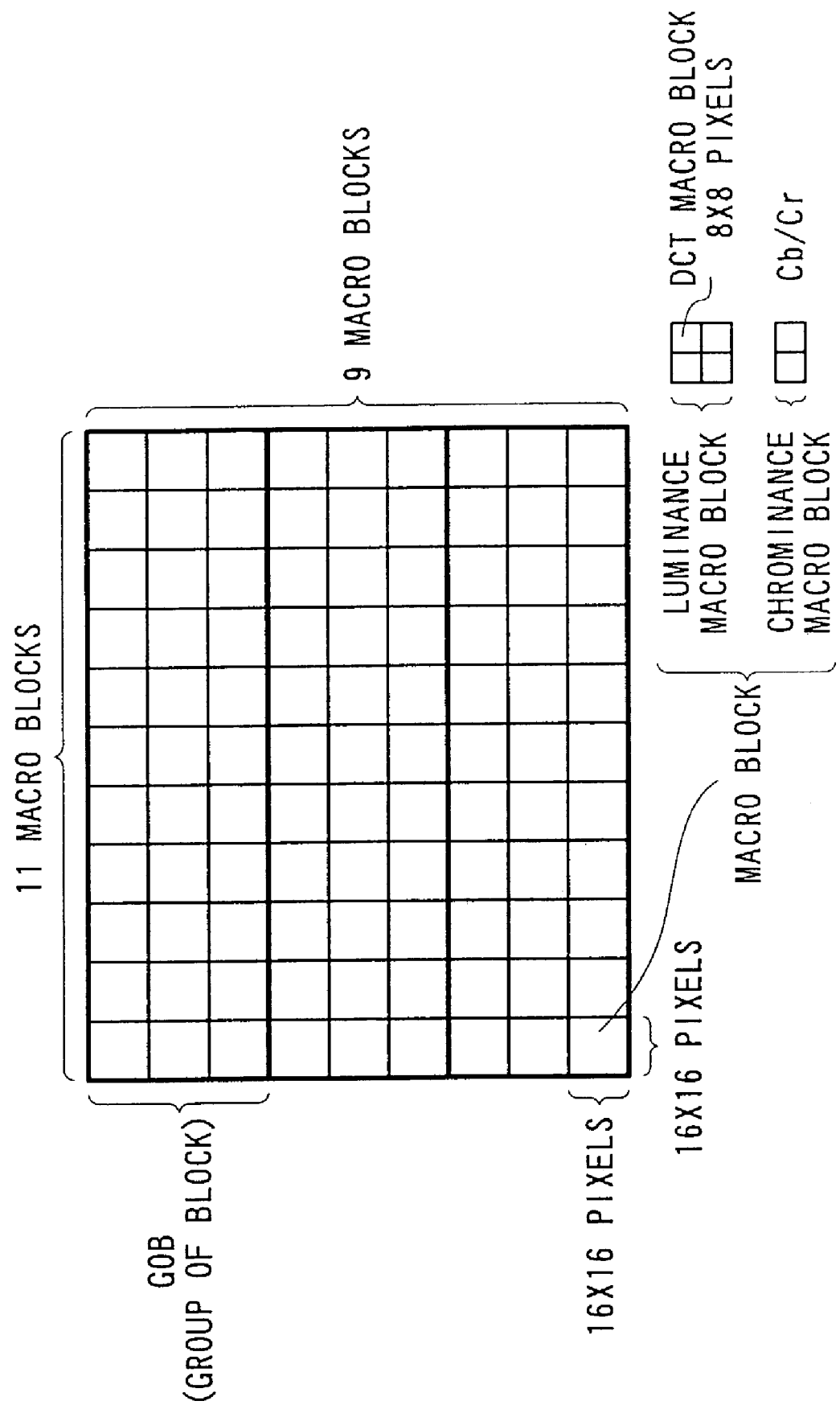
FIG. 4 is a diagram illustrating an image data structure in the H.261 standard.

FIG. 4 illustrates an image data structure in the H.261 standard. An image to be code is called QCIF (Quarter Common Interface Format), and is assumed to have 176 pixels in the horizontal direction and 144 pixels in the vertical direction. Also in the H.261 standard, the image is divided to macro blocks each comprised of 16×16 pixels. The motion compensation is performed on a macroblock-by-macroblok basis, while the DCT coding is performed on a DCTblock-by-DCTblock basis. The DCT block is comprised of 8×8 pixels. Since 4 DCT blocks are necessary for luminance, and 2 DCT blocks are necessary for chrominance (1 for Cb or Cr) because the resolution therefor is half that for luminance in the horizontal and vertical directions, the macro block is composed of 6 DCT blocks. A block comprised of three lines of macro blocks is called GOB (Group of Block).

Figure 5:
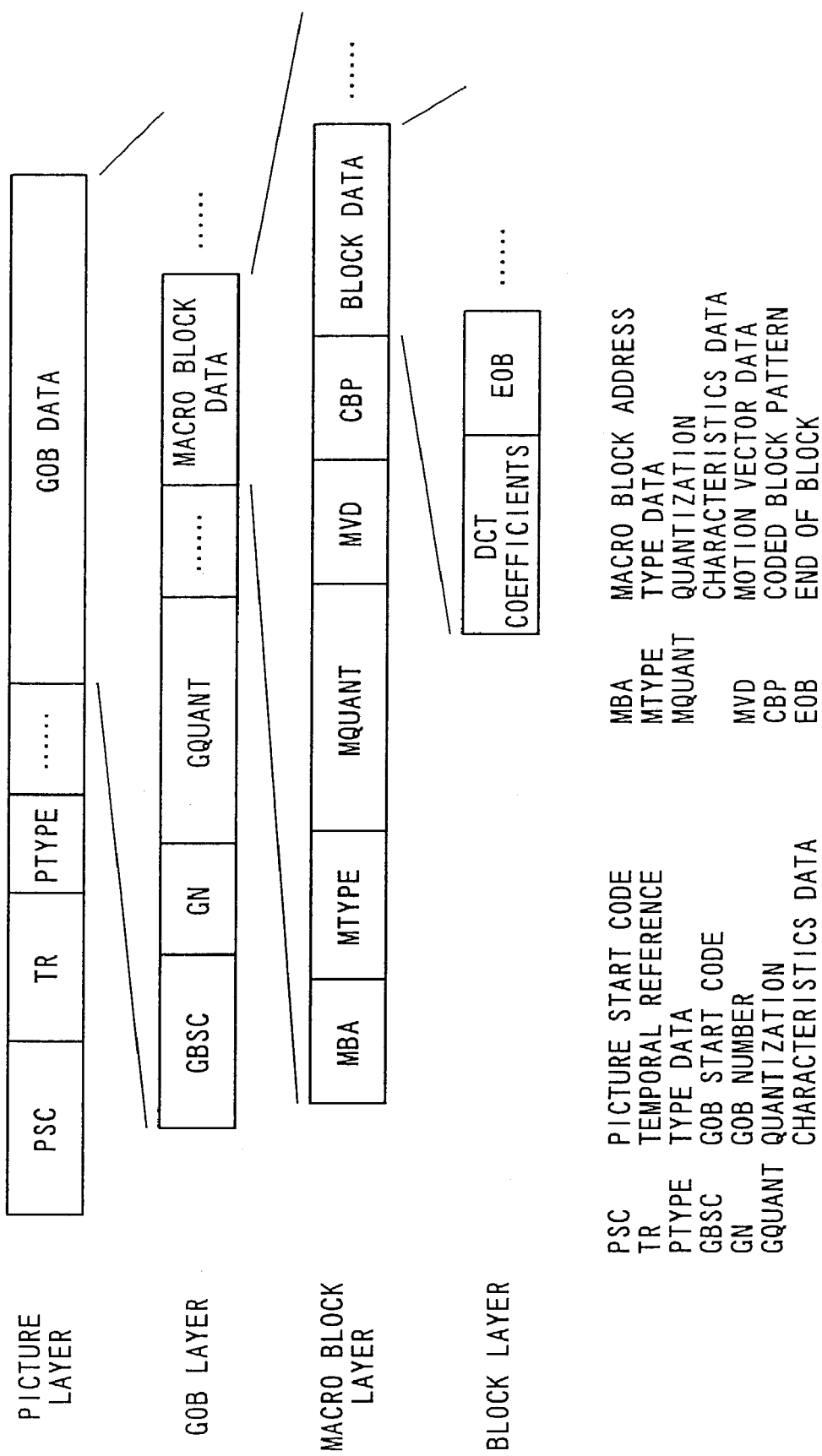
FIG. 5 is a diagram illustrating a data structure in the H.261 standard.

FIG. 5 illustrates the data structure coded based on the H.261 standard. The explanation is performed while separating the bit-stream to four layers. The bit-stream is composed of repeated pictures (frames), and has PSC (Picture Start Code) at a first portion followed by TR (Temporal Reference), and then PTYPE (Picture Type; Type data). In H.261, PTYPE is indicative of a picture size and reproduction mode, and not indicative of information on whether the frame is subjected to intra-frame coding (intra-coding) or inter-frame coding (inter-coding). Thereafter, GOB layers are repeated (three times in the case of QCIF)

The head of GOB layer is started by GBSC (GOB Start Code), GN (GOB Number) succeeds GBSC, and then GQUANT (Quantization Characteristic Data) is transmitted. In H.261, the quantization of DCT coefficients is performed with a quantization scale represented by one of indices of 1 to 31 in the inter-coding, while a single type of such quantization corresponding to index 8 is performed in the intra-coding.

The quantization scale of DCT coefficient for the GOB is instructed with GQUANT. Macro block data is repeated at an end portion of the GOB layer. The macro block data is started with MBA (Macro Block Address), which indicates a relative position of macro block containing valid code. In the MC-DCT coding, an image is reproduced in a still region without transmitting a motion vector and also DCT coefficient.

In such a region, it is not necessary to transmit data of macro blocks, which is called macro block skip, and therefore MBA is needed. MTYPE (Type data) is used to instruct whether the macro block is inter-frame coded or intra-frame coded. In the MC-DCT coding except H.261, it is general that the switching between intra-coding and inter-coding is performed on a macroblock-by-macroblcok basis in addition to the switching between intra-coding and inter-coding on a frame-by-frame basis.

Further, MTYPE includes information on whether the macro block is subjected to loop filter. The loop filter is specific processing in H.261 (not included in other standards) to subject a motion-compensated predicted image to filtering by local-averaging. Since the predictive efficiency is improved in some cases, the loop filtering is adaptively used. MQUANT (Quantization Characteristics) is indicative of the quantization scale of DCT coefficient for the GOB determined with GQUANT, and is transmitted in the case where the quantization scale is needed to be changed on a macroblock-by-macroblok basis. MVD (Motion Vector Data) is indicative of a motion vector used for motion compensation. CBP (Coded Block Pattern) is indicative of a significant block pattern.

Among total 6 DCT blocks, it is not necessary to transmit a block of which the quantized DCT coefficients show all zero. Therefore, the DCT coefficients are transmitted while designating only a block with nonzero coefficients with CBP.

The MPEG-4 standard is next explained.

MPEG-4 has a variety of functions called profiles used depending on applications. The embodiments use a simple profile that is the simplest one as a subject of the transformation.

Figure 6:
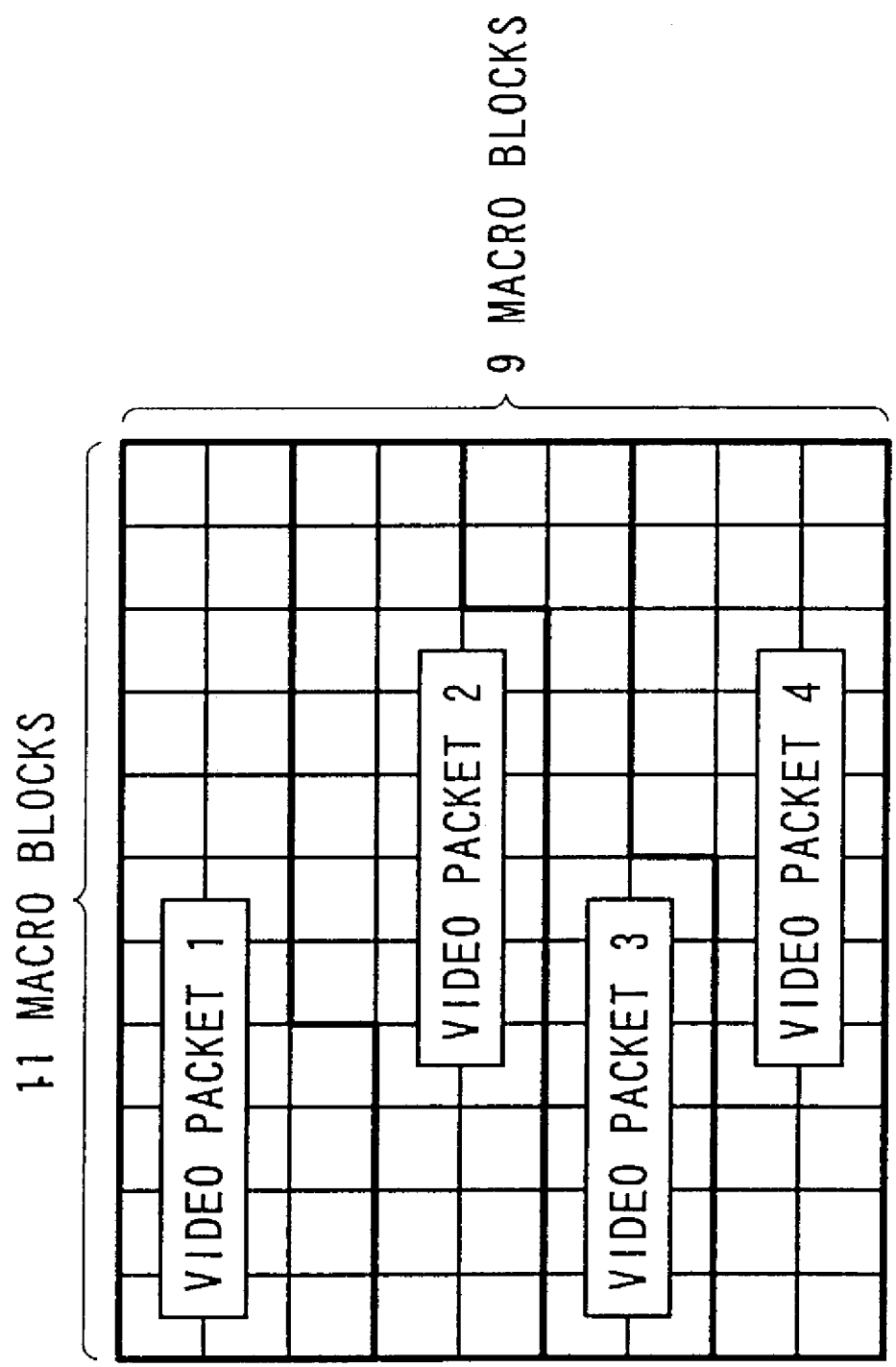
FIG. 6 is a diagram illustrating an image data structure in the MPEG-4 visual simple profile.
Figure 7:
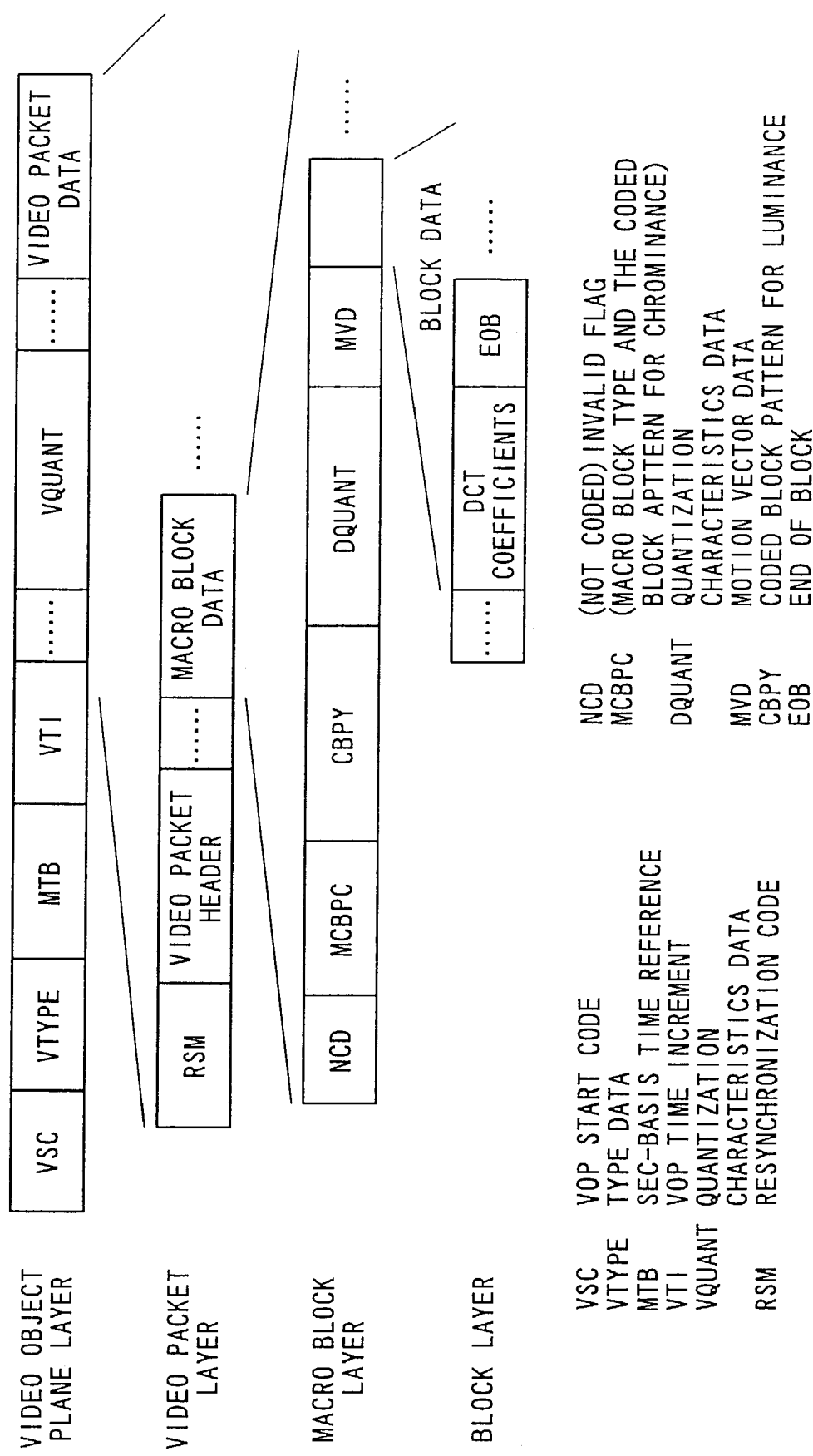
FIG. 7 is a diagram illustrating a data structure in the MPEG-4 visual simple profile.

FIG. 6 illustrates an image data structure in MPEG-4. In H.261, the picture size is defined as a QCIF picture and CIF picture with horizontal and vertical sizes respectively twice those of CIF (Common Interface Format) picture. In MPEG4, however, the picture size is arbitrary, and not limited to even a number multiplied by 16. Further, in MPEG-4, the aspect ratio of a pixel (ratio of a vertical line to a horizontal line when the pixel is considered to be a rectangle) is also arbitrary. Such a ratio is 4:3 in H.261.

Therefore, picture sizes to be handled hereinafter are all matched with those specified in H.261 to simplify the explanation.

A structure called Video Packet is defined in MPEG4 instead of GOB in H.261. On the contrary to that GOB is obtained by dividing an image to fixed rectangles, a starting point of the Video Packet is arbitrary on a macroblock-by-macroblock basis. The other structures of DCT block are almost the same as in H.261, and omitted in FIG. 6.

In MPEG-4, an image corresponding to a frame or picture is called Video Object Plane (hereinafter referred to as VOP).

A bit-stream in MPEG4 starts with VSC (VOP start code) followed by VTYPE (vop coding type) indicative of information on whether the frame is intra-frame coding (intra-coding) or inter-frame coding (inter-coded). In H.261, TR (Temporal Reference) is indicative of a frame number as a time indication, however, in MPEG4, a passing time from a reference frame is directly instructed with MTB (module time base) with the order of a second, and with VTI (vop time increment) with the order of less-than-second, of which the detailed explanation is described in the above reference and omitted herein. VQAUNT is indicative of quantization characteristic data, corresponding to GQUANT in H.261, to designate a quantization scale in the entire image. RSM (Resync Marke) is inserted before a Video Packet header to perform resynchronization promptly for transmission error. The Video Packet header contains data concerning VOP needed after the resynchronization.

The macro block data starts from NCD (Not Coded, invalid flag). In H.261, an invalid macro block is skipped by using a relative address to next valid macro block with MBA, however, in MPEG4, the invalid macro block is represented by a flag of 1 bit. MCBPC (macroblock type and the coded block pattern for chrominance) is used to perform the switching between intra-coding and inter-coding in the same way as MTYPE.

In addition, since MPEG-4 does not include the loop filter, MCBPC does not include an indication for the loop filter. Meanwhile, MCBPC is indicative of valid/invalid pattern of DCT block of a signal. In other words, MCBPC includes data concerning chrominance signal among data of CBP in H.261. With respect to the valid/invalid pattern of luminance DCT blocks, a pattern of luminance four blocks composing macro blocks is represented with CBPY (luminance significant block pattern).

DQUANT is for use in changing the quantization scale of DCT coefficients on a macroblock-by-macroblok basis. An increment or decrement value is designated in the range of −2 to +2, which is different from MQUANT. MVD (Motion Vector Data) is indicative of a motion vector used in motion compensation. The accuracy in H.261 is of an integer-number-of-pixel basis, however the accuracy in MPEG-4 is of a half-pixel (0.5 pixel) basis. The structure of DCT coefficient block is almost the same as in H.261.

As described above, MPEG-4 with the simplest structure shares the basic structure of the MC-DCT with H.261, and although the data structure of MPEG-4 is different in representation way (coding description) from that of H.261, there is a lot of compatibility in both data. The considerable differences between H.261 and MPEG4 in transforming the coding system are as follows:

Motion compensation
H.261: Integer-accuracy and loop filter
MPEG4: half-pixel accuracy A search range can be changed by scaling called F value; and there is a mode in which four motion vectors are present per a macro block.

DCT Coefficient Quantization
Linear quantization with the same quantization scale in H.261 and MPEG4 in addition, with respect to a direct current component in an intra-coding mode, MPEG4 has a non-linear quantization mode, while the intra-coding in H.261 fixes a quantization index to 8.

Figure 1:
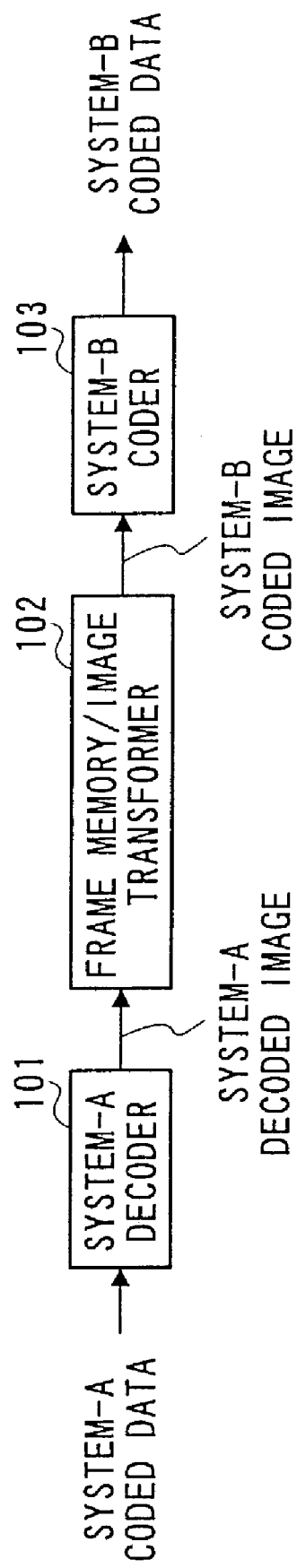
FIG. 1 illustrates a conceptual diagram of a transcoder.
Figure 2:
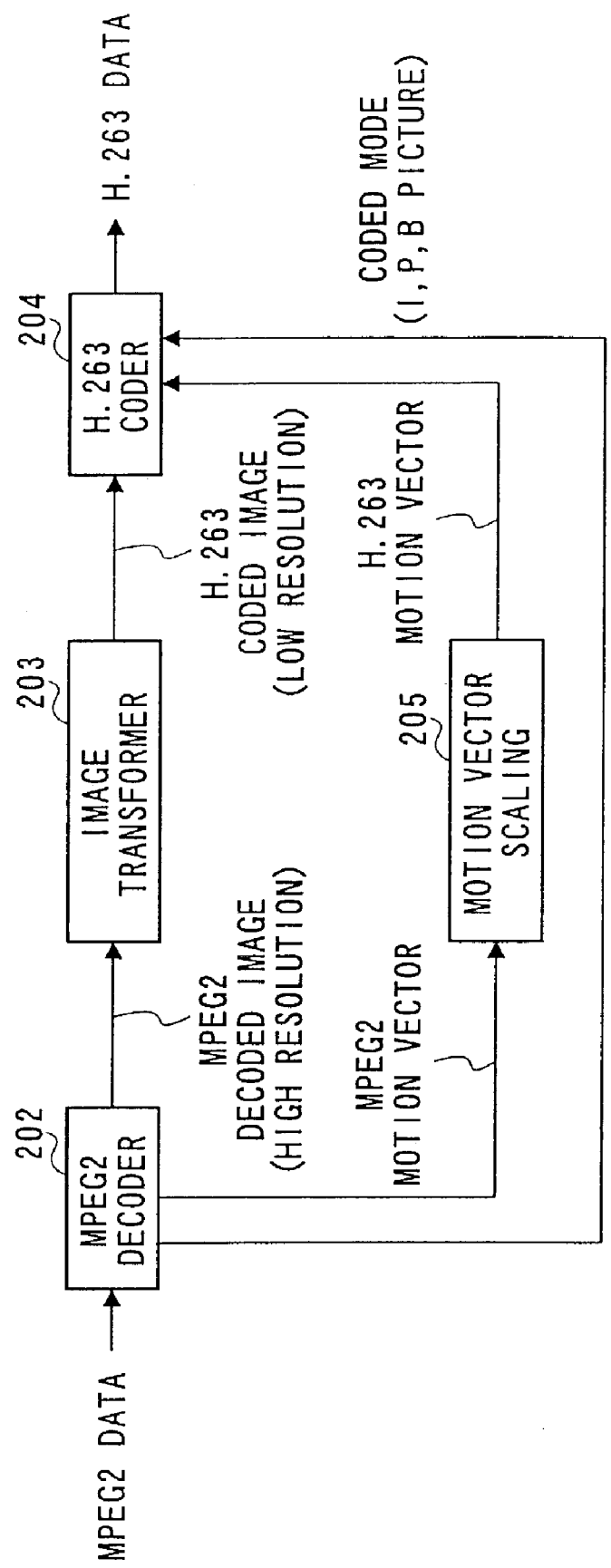
FIG. 2 is a diagram illustrating an exemplary conventional transcoder.
Figure 3:
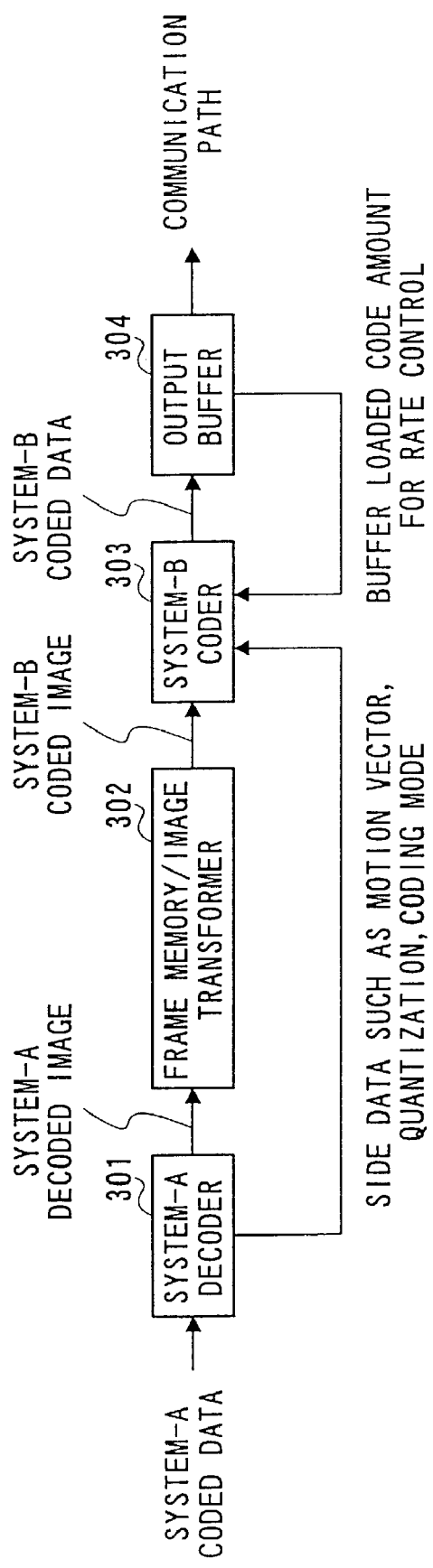
FIG. 3 illustrates a conceptual diagram showing subjects for the transcoder.

From the differences as described above, a transcoder cannot have a configuration to transfer DCT coefficient directly, and therefore has a configuration, as illustrated in FIG. 3, where in transforming data based on the system A (H.261 or MPEG4) to data based on the system B (MPEG4 or H.261), the system-A-coded data is once decoded and the decoded image is recoded through frame memory 302.

Figure 8:
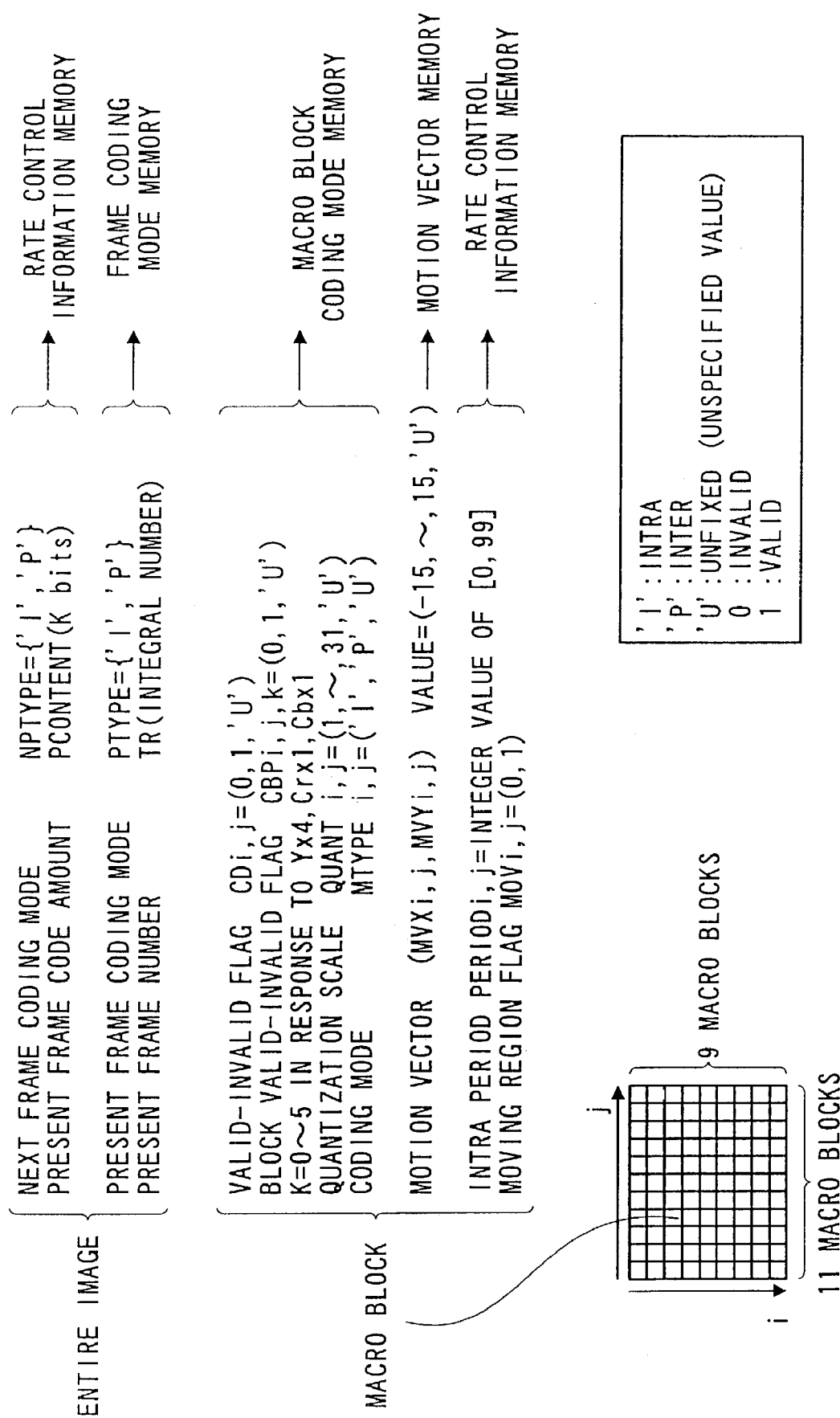
FIG. 8 is a diagram illustrating intermediate data in a transcoder.

In this case, as the side information, intermediate data for the transcoder illustrated in FIG. 8 is considered.

FIG. 8 also illustrates storage sections in the memory in which respective data is stored, corresponding to an embodiment described later.

The meaning of each data is explained below. As can be seen from the data structure as described above, the data can be used as the intermediate data.

Next Frame Coding Mode NPTYPE=['I', 'P', 'U'] Obtain by prereading during decoding in the system A. VTYPE in MPEG-4, and 'U': unfixed in H.261.

Present Frame Coded Content Pcontnet (unit:kbits) Obtain by decoding one frame in the system A When recoding is performed after one frame is completely decoded, the content is equivalent to a code amount for one frame. When recoding starts in the middle of decoding of an original image, the content is equivalent to a code amount obtained by the time the decoding is suspended after starting on the frame.

Present Frame Coding Mode PTYPE=['I', 'P'] 'I' represents intra-coding, and 'P' represents inter-coding. In H.261, 'I' means all macro blocks are intra-coded, and 'P' means the other cases except the above. This is determined from PREDI,j described later.

Present Frame Number TR (Integer number) In MPEG-4, obtained from MTB and VTI.

Valid/Invalid flag CDij=[0, 1, 'U'] This flag indicates valid: 0 or invalid: 1 of a macro block i and j respectively represent horizontal and vertical positions of the macro block. 'U' represents 'unfixed'. For example, the case where a P picture in the system A is recoded to obtain an I picture in the system B is represented with 'unfixed'.

Block Valid/Invalid flag CBPi,j,k=[0, 1, 'U'] This flag indicates valid or invalid of a DCT block. In MPEG-4, determined by MCBPC and CBPY. Since Y×4, Cr×1 and Cb×1, k adopts values of 0 to 5.

Quantization Scale QUANTi,j [1, ~, 31, 'U'] This is an index indicative of a quantization scale on a macroblock-by-macroblock basis.

Coding mode MTYPEi,j=['I', 'P', 'U'] This represents a coding mode of intra or inter on a macroblock-by-macroblock basis. 'U' represents 'unfixed'.

Motion Vector (MVXi,j, MVYi,j)
Value is [−15, −, 15, 'U']

Horizontal and vertical absolute values of a motion vector are represented with integer-accuracy to match with H.261 that employs the integer-accuracy Intra Period PERIODi,j=integer number of [0, 99]

In the MC-DCT system, accuracy in inter-frame DCT computation is accumulated, causing a mismatch of the computation between coding and decoding.

To cope with it, intra-coding on a macro block should be performed within a 132-coded-frame period.

This operation is called intra-refreshing. PERIOD is a counter to perform the intra-refreshing periodically. Default is 0.

Moving Region flag MOVi, j=[0, 1, 'U'] This flag indicates whether the macro block is contained in a moving region. '1' is indicative of a moving region. In this embodiment, an absolute value of either of elements (MVXi,j, MVYi,j) being equal to or more than 1 is indicative of a moving region.

The data structures of H.261 and MPEG4 are as described above. The flowchart common to the first embodiment and second embodiment is next explained with FIG. 9.

First, all i and j of PERIODi,j are set at 0 by initialization. This data concerns the intra-inter coding control on a macroblock-by-macroblock basis.

Next, according to the steps of reconstruction of the system-A image (H.261 or MPEG-4) and of generation of intermediate data, a reproduced image and intermediate data of NPTYPE, Pcontent, PTYPE, TR, CDi,j, CBPi,j,k, QUANTi,j, MTYPEi,j, (MVXi,j, MVYi,j), and MOVi,j is generated.

Herein, the basic principle of the transcoder for all the embodiments are as follows:

Basic principle 1: Among the side information generated in the system-A decoding, PTYPE, TR, CDi,j, CBPi,j,k, QUANTi,j, and MTYPEi,j are basically all shifted to the system-B coding mode to use. It is thus possible to prevent the accumulated image quality deterioration due to requantization.

In addition, some of the side information generated in the system-A decoding is changed for the rate control. The method of the change is described later.

Basic principle 2: Motion vector data (MVXi,j and MVYi, j) is used as reference data in the system-B recoding. In other words, when the value of the motion vector is fixed, researching a position that minimizes the differential between macro blocks as a motion vector is performed in the vicinity of the fixed value, while the search is performed from (0,0) when 'U'.

Figure 9:
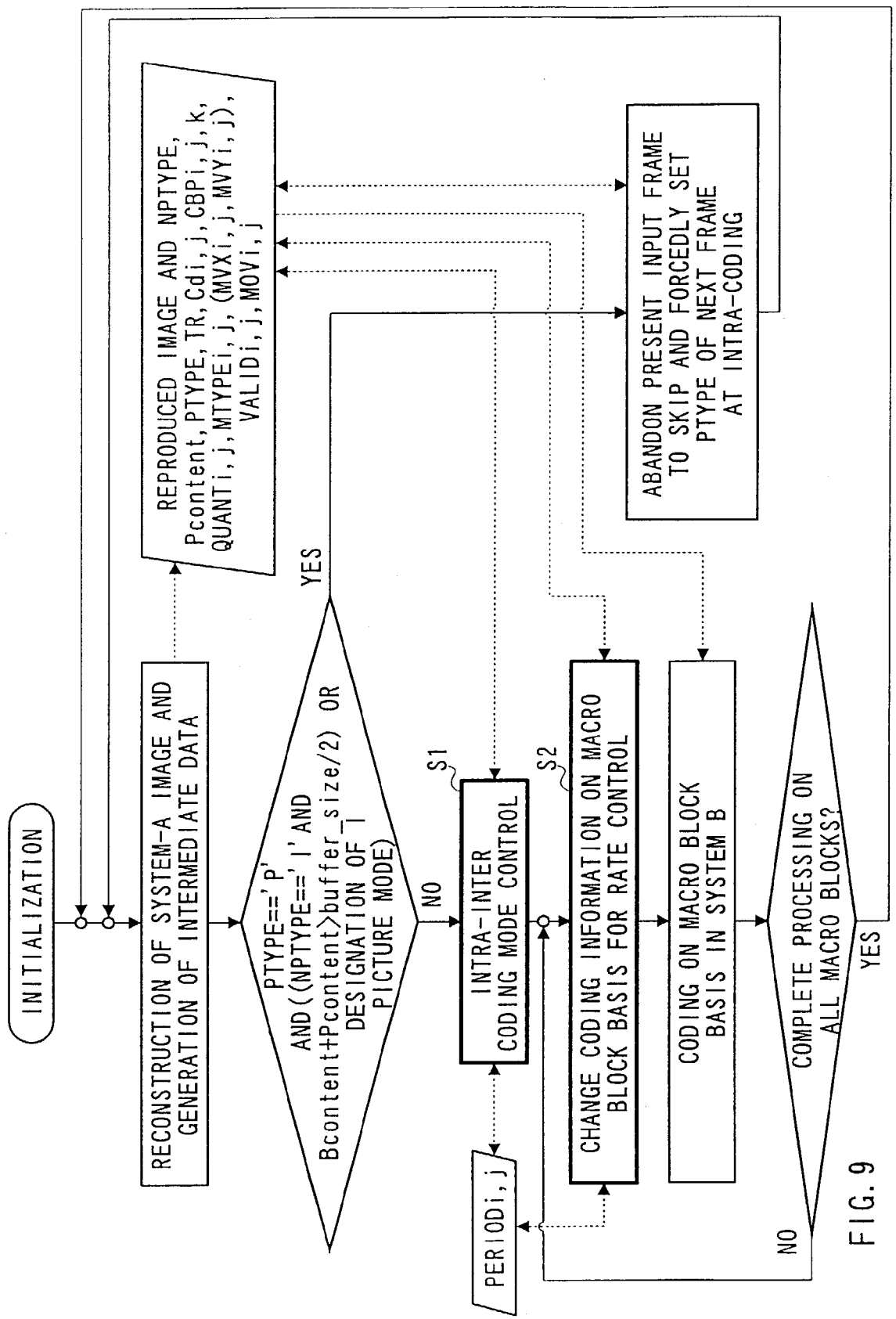
FIG. 9 is a flowchart for the entire process of the transcoder.

In FIG. 9, after the intermediate data is generated, the flow goes to the branching.

When the coding mode of the present frame is the inter-coding mode, the coding mode of the next frame is the intra-coding mode, and the buffer loaded code amount (Bcontent in the figure) is as follows:

Pcontent(Accumulated code amount of the frame)>half the buffer capacity, the present input frame is abandoned, the coding thereof is discontinued, and the next frame is intra-coded.

Further, the same processing as described above is performed in the case where a decoding side instructs to forcedly intra-code the next frame. When an error occurs, the decoding side instructs to forcedly intra-code the next frame.

In the MC-DCT coding, the intra-coded frame, called 'I' picture, is important. It is because frames succeeding the 'I' picture cannot be decoded without the 'I' picture. Meanwhile, when the capacity left in the output buffer is relatively small, the execution of recoding according to the above-mentioned basic principle 1 causes a risk that data overflows the output buffer in recoding the 'I' picture. When the 'I' picture is not coded due to the overflow, the image quality deteriorates.

Then, NPTYPE of the successive frame succeeding the present input frame is preread, and the coding processing in the system B is switched corresponding to NPTYPE of the successive frame and a current buffer loaded code amount (Bcontent). In other words, when the successive frame is the 'I' picture, and there is a possibility that data overflows the output buffer when the 'I' picture is recoded, the present input frame ('P' picture) is abandoned to ensure the capacity of the output buffer for the 'I' picture that is the successive frame to be recoded. This concept is shown in FIG. 9.

In addition, in H.261, since a mode indication indicative of intra or inter coding is not at a head of a frame, the conditional branching in FIG. 9 is applicable only to the transformation from MPEG-4 to H.261.

In FIG. 9, the flow is 'no' in the conditional branching (always 'no' in the transformation from H.261 to MPEG-4), the flow goes to intra-inter coding mode control. With respect to the processing performed after this control, a first embodiment describes the transformation method from H.261 to MPEG-4, and a second embodiment describes the transformation method from MPEG-4 to H.261.

Figure 10:
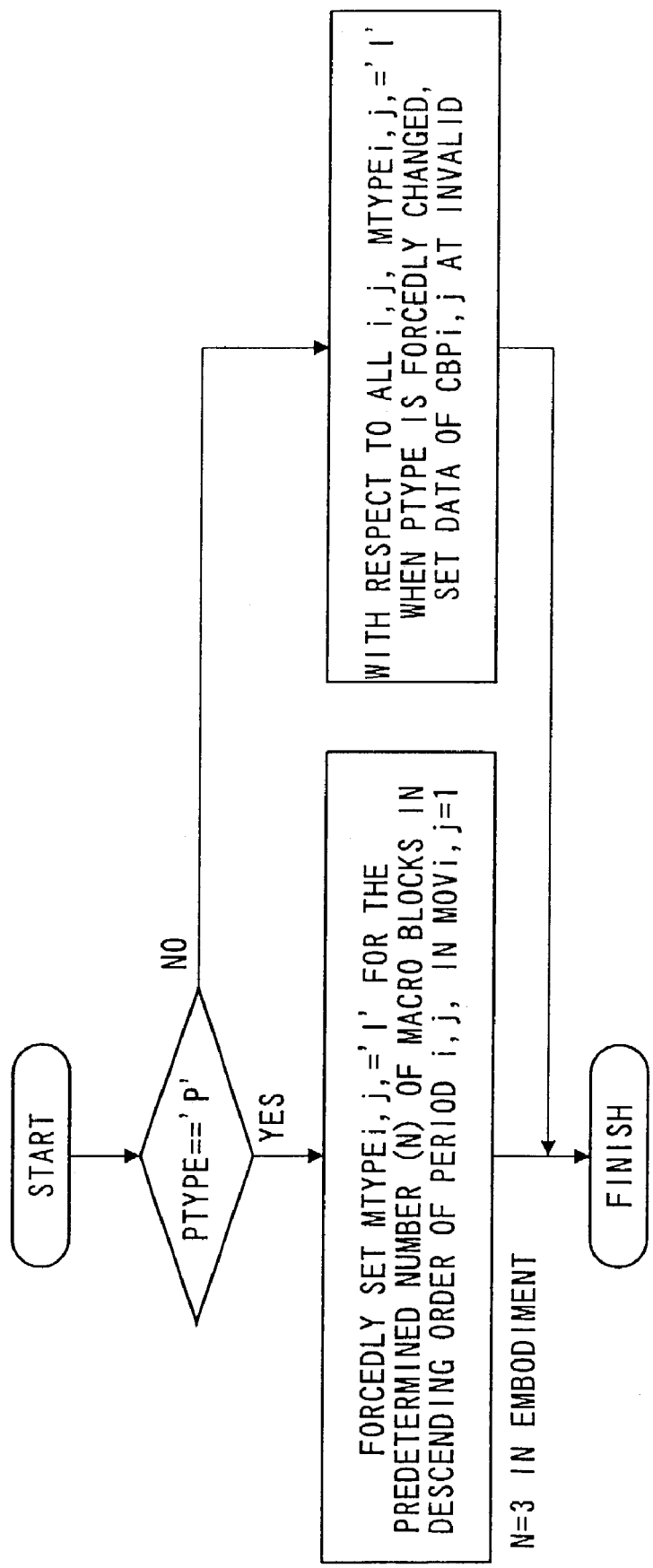
FIG. 10 is a flowchart to control intra-inter coding mode in a transformation of H.261 to MPEG-4.
Figure 11:
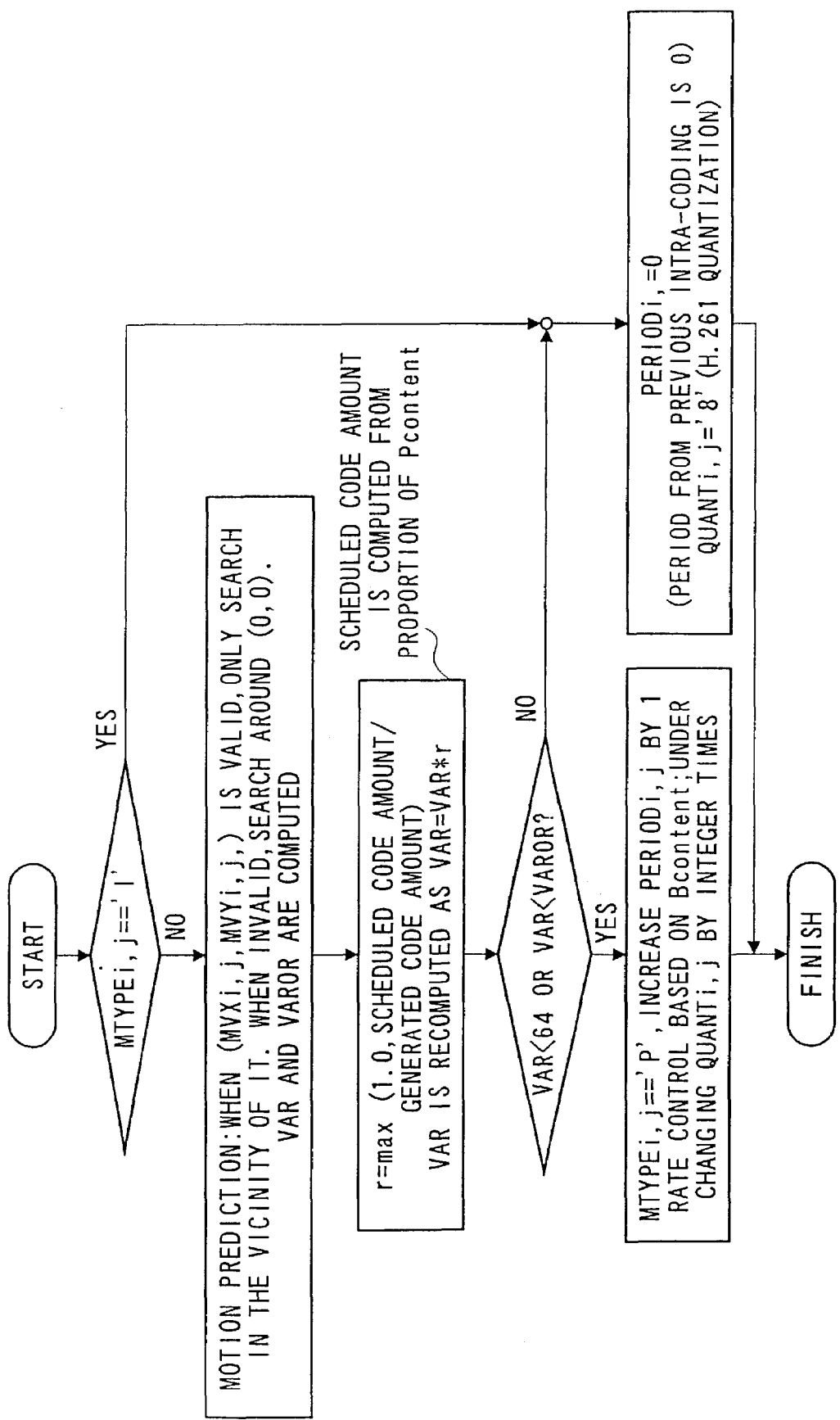
FIG. 11 is a flowchart to change coding data on a macroblock-by-macroblock basis for rate control in the transformation of H.261 to MPEG-4.

In the first embodiment, the transformation based on flowcharts illustrated in FIGS. 9 to 11 is performed. Among process steps enclosed with bold lines in FIG. 9, the intra-inter coding mode control (S1) is performed according to the flowchart illustrated in FIG. 10, and change of coding data on a macroblock-by-macroblock basis for the rate control (S2) is performed according to the flowchart illustrated in FIG. 11.

Herein, it is assumed that, as conditions for the rate control, a coding rate of H.261 is 64 kbps, a coding rate of MPEG-4 is also 64 kbps, and that a buffer size of the output buffer is 6.4 kbit.

In the intra-inter coding mode control illustrated in FIG. 10, when the H.261 data sequence is transformed to the MPEG-4 data sequence, the predetermined number (3 in this embodiment) of macro blocks are selected from macro blocks belonging a moving region in descending order of refreshing period, and the coding mode of the selected macro blocks are forcedly changed to the intra-coding mode.

According to the processing as described above, since intra-refreshing is performed on the macro blocks mainly belonging to the moving region, the error-resistance characteristic of the MPEG-4 bit-stream is improved. It is because when a transmission error occurs in a still picture region, the error is recovered by copying the result of the previous frame, causing image quality deterioration in the moving region.

FIG. 11 illustrates the processing steps for recoding the macro blocks judged as the inter-coding mode. AS a motion prediction, the processing shown in the basic principle 2 of the transcoder is performed.

At this stage, VAR and VAROR are computed. In addition, VAR is a mean square of motion compensated inter-block differential pixels (luminance variance), and indicates power of inter-frame differential signal, while VAROR is a mean square of input image intra-block pixels (luminance variance), and indicates power of intra-frame signal.

RM8 (described in the previously-described cited reference) typical as a model of H. 261 coder determines whether the coding mode of a macro block is inter or intra coding mode using the VAR and VAROR. Specifically, the inter-coding is performed when VAR<64, i.e., a power level of the inter-frame differential signal is absolutely small, or VAR<VAROR, i.e., the power level of the inter-frame differential signal is smaller than the power level of the intra-frame signal.

In the inter-coding, the rate control is performed to adjust a generated code amount so that the buffer loaded code amount (Bcontent) comes close to a scheduled code amount. In this embodiment, the scheduled code amount is computed based on the following equation: Scheduled code amount =Pcontent×(MPEG-4 coding rate/H.261 coding rate)×the number of currently processed macro blocks/the total number of macro blocks In this embodiment, the coding rates are both 64 kbps, (MPEG4 coding rate/H.261 coding rate) is 1 (=1).

Thus, since the scheduled code amount (in other words, target coded content) is computed based on Pcontent, it is possible to achieve originally performed rate control, while maintaining the quantization control in H.261 as much as possible. For example, the rate control is performed so that a ratio of code amounts on a coding-unit basis of data composing the system-A data sequence comes close to a ratio of code amounts on the coding-unit basis of data composing the system-B data sequence. As a result, the concept in constructing the system-A data sequence is maintained in the system-B data sequence after the transformation.

In addition, coefficient "r" that is a factor to be multiplied VAR is calculated based on the following equation:

r=max (1.0, scheduled code amount/generated code amount)

Therefore, VAR is more than 1 when the generated code amount is less than the scheduled code amount. Accordingly, VAR=VAR*r is set to increase VAR in the case where the capacity left in the output buffer is relatively large (the generated code amount is less than the scheduled code amount), so that intra-coding modes are more selected, thus controlling the mode.

In general coder control, a quantization scale is decreased to improve the image quality when a bit rate is relatively high. In the system-transformation-coding according to the present invention, however, as described previously, since it is preferable not to change quantization characteristics as possible, the number of frames of the intra-coding mode (I picture) is increased with the change of quantization scale minimized. This processing improves the error-resistance characteristic for transmission failure such as packet loss. Generally, since it is considered that the coding efficiency of MPEG-4 is higher than that of H.261, in the transformation with the same coding rates, the above-described advantage is obtained by controlling to adopt more intra-coding modes within a range of the capacity left in the output buffer.

In addition, the final step in the flowchart illustrated in FIG. 11 is the control for QUANTI, j. In RM8, the quantization scale is obtained in the following equation in the case of 64 kbps:

Quantization scale=2×int(buffer loaded code amount [bit]/200+2

Controlling the quantization scale based on the above equation achieves the feedback control that the quantization scale is increased when the buffer loaded code amount is increased, thus decreasing the generated code amount.

In this embodiment, in consideration of the relationship between the accumulation of quantization errors and generated bit contents, the quantization scale is changed as follows:

buffer loaded code amount>70% of buffer capacity quantization scale=QUANTi,j×2
buffer loaded code amount>80% of buffer capacity quantization scale=QUANTi,j×3
buffer loaded code amount>90% of buffer capacity quantization scale=QUANTi,j×4

In addition, in MPEG-4, since a value of QUANTI, j is only allowed to be changed by maximum 2 in neighboring macro blocks, the change scale is limited to maximum 2.

Thus, the coding mode is first controlled to make the buffer loaded code amount close to the target coded content, and when it is further necessary to change the quantization characteristic (quantization scale), the quantization scale in the system B is set to be integer times the quantization scale in the system A.

The first embodiment, as described above, achieves an example of methods for performing the rate control, while maintaining the quantization characteristics performed before the system is transformed.

In addition, when the capacity left in the output buffer is relatively large, the number of macro blocks to be intra-coded is increased by redefining the value of VAR, according to this embodiment. However, it may be also possible to increase or decrease a value N of intra-refreshing of a macro block belonging to a moving region.

The second embodiment is next described.

The second embodiment describes the transformation method from MPEG-4 to H.261. The transformation operations in this embodiment are performed based on flowcharts illustrated in FIGS. 9, 12 and 13.

Figure 12:
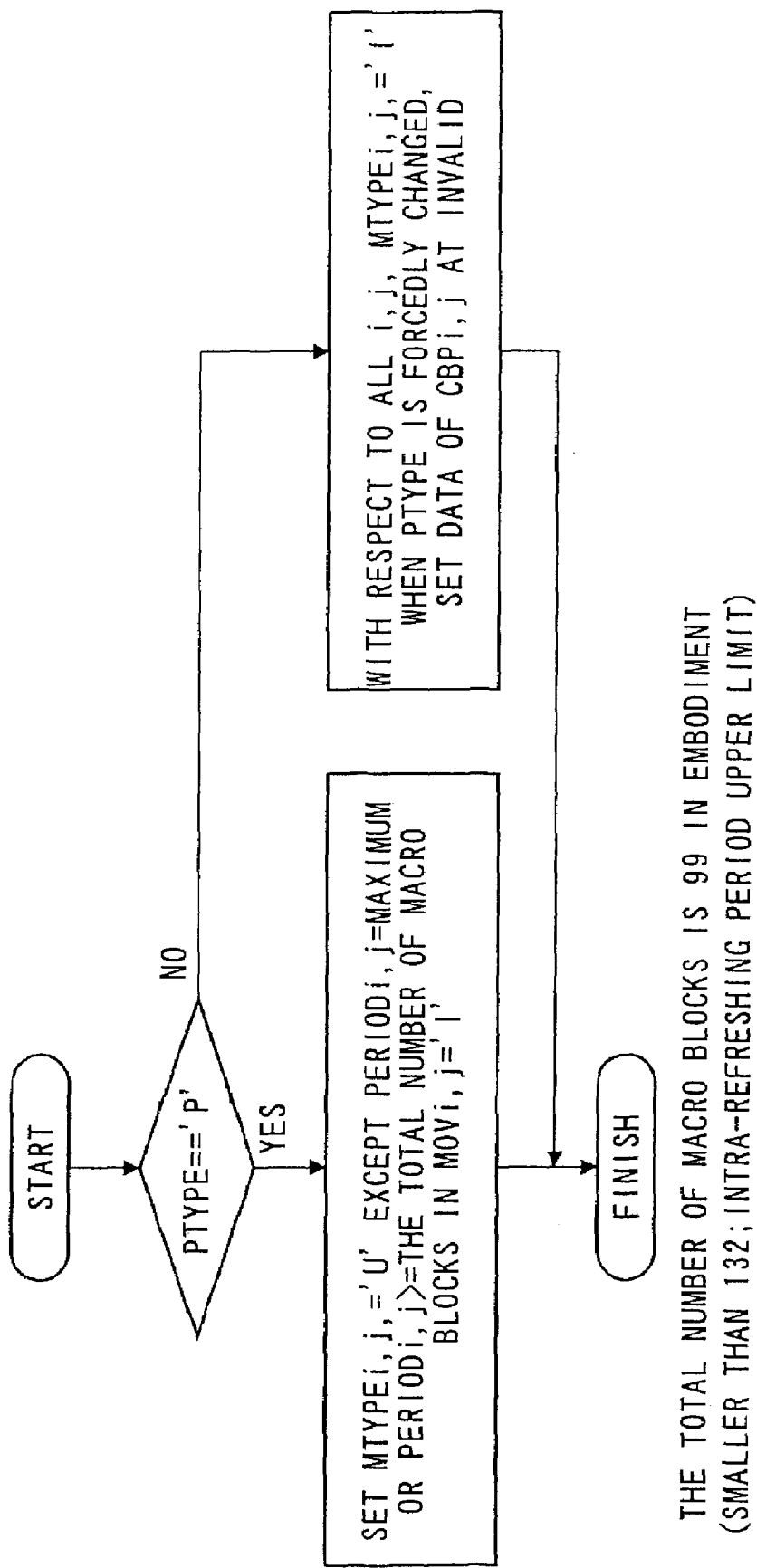
FIG. 12 is a flowchart to control intra-inter coding mode in a transformation of MPEG-4 to H.261.
Figure 13:
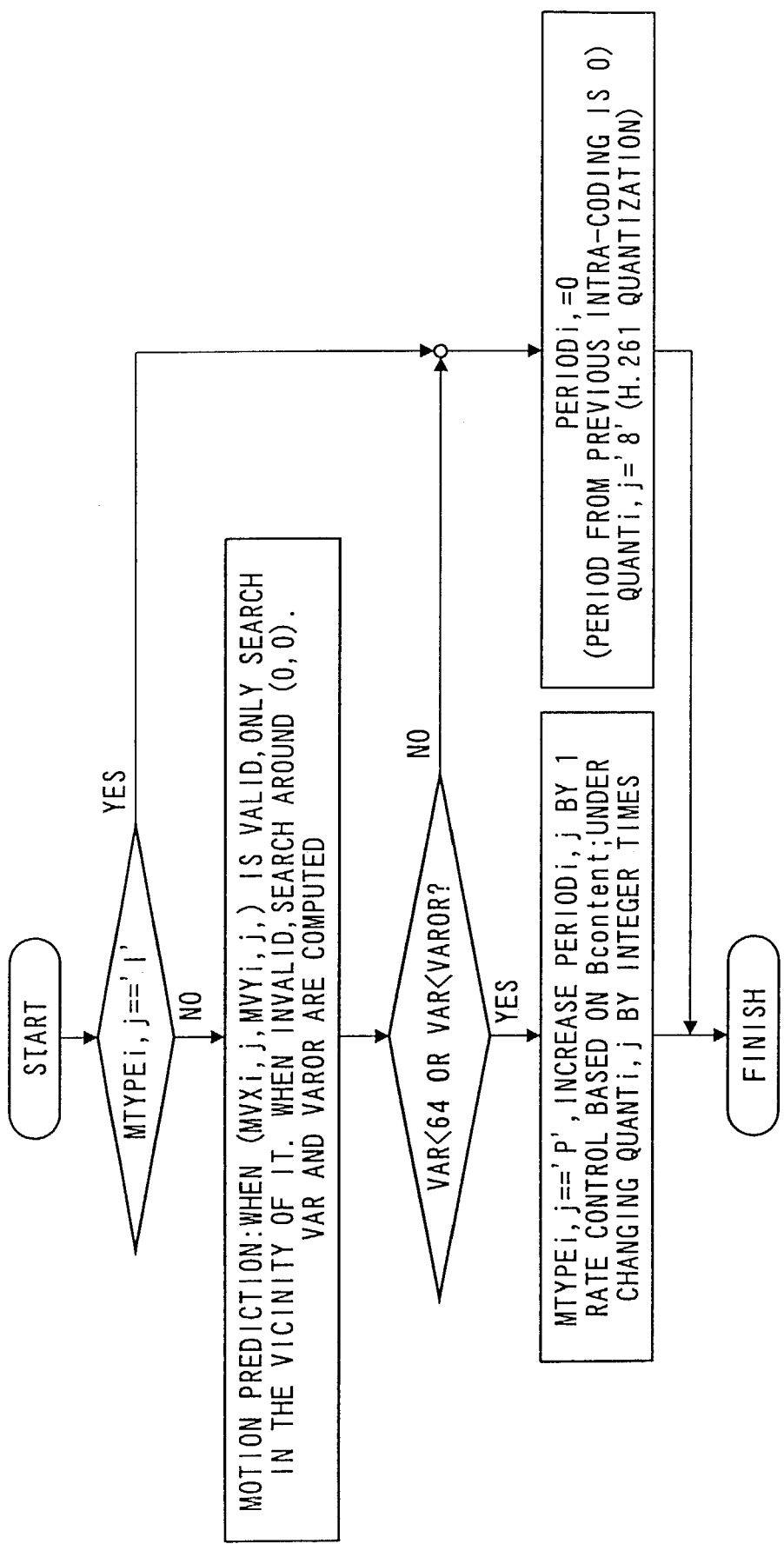
FIG. 13 is a flowchart to change coding data on a macroblock-by-macroblock basis for rate control in the transformation of MPEG-4 to H.261.

Among processing steps enclosed with bold lines, the intra-inter coding mode control is performed according to the flowchart in FIG. 12, and the change of coding data on a macroblock-by-macroblock for the rate control is performed according to the flowchart in FIG. 13.

The difference of this embodiment from the first embodiment is mainly explained to simplify the explanation.

Herein, it is assumed that macro blocks more than needed are intra-coded to improve the error resistance although the coding efficiency of MPEG-4 is higher than that of H.261.

In the control for the intra-inter coding mode illustrated in FIG. 12, coding modes of intra-coded macro blocks are set at 'U' (unfixed) except macro block with the maximum PERIODi,j, or macro block with PERIODi,j exceeding the total number of macro blocks (99). Thus, even in the case where the coding mode of the present frame is the inter-frame coding mode, minimum intra-coded macro blocks are only left, and coding modes of other intra-coded macro blocks are set at 'U' (unfixed). As a result, the case occurs that the other intra-coded macro blocks are inter-coded again in next step (FIG. 13).

In the case where data is transformed from the system B of which the coding efficiency is high to the system A of which the coding efficiency is relatively low, when I pictures (intra-coded pictures) contained in the system-B data sequence B are all transformed to data in the system-A data sequence, there is a possibility that data overflows the output buffer because the code amount of an I picture is larger than that of a P picture (inter-coded picture). In this embodiment, the number of macro blocks to be intra-coded is decreased to prevent the overflow in the buffer without controlling the quantization scale. In other words, the number of macro blocks to be inter-coded is relatively increased.

The judgement of intra-inter coding illustrated in FIG. 13 is a general judgement method with VAR and VAROR described in RM8. QUANTi,j control that is the final step in FIG. 13 is the same as in the first embodiment, and the explanation thereof is omitted.

According to the second embodiment, in the system transformation to H.261 of which the coding efficiency is generally considered to be less than that of MPEG-4, intra-coded macro blocks are changed to inter-coded macro blocks while changing the coding mode, thereby making it possible to prevent the overflow in the buffer without controlling the quantization scale for other macro blocks.

Figure 14:
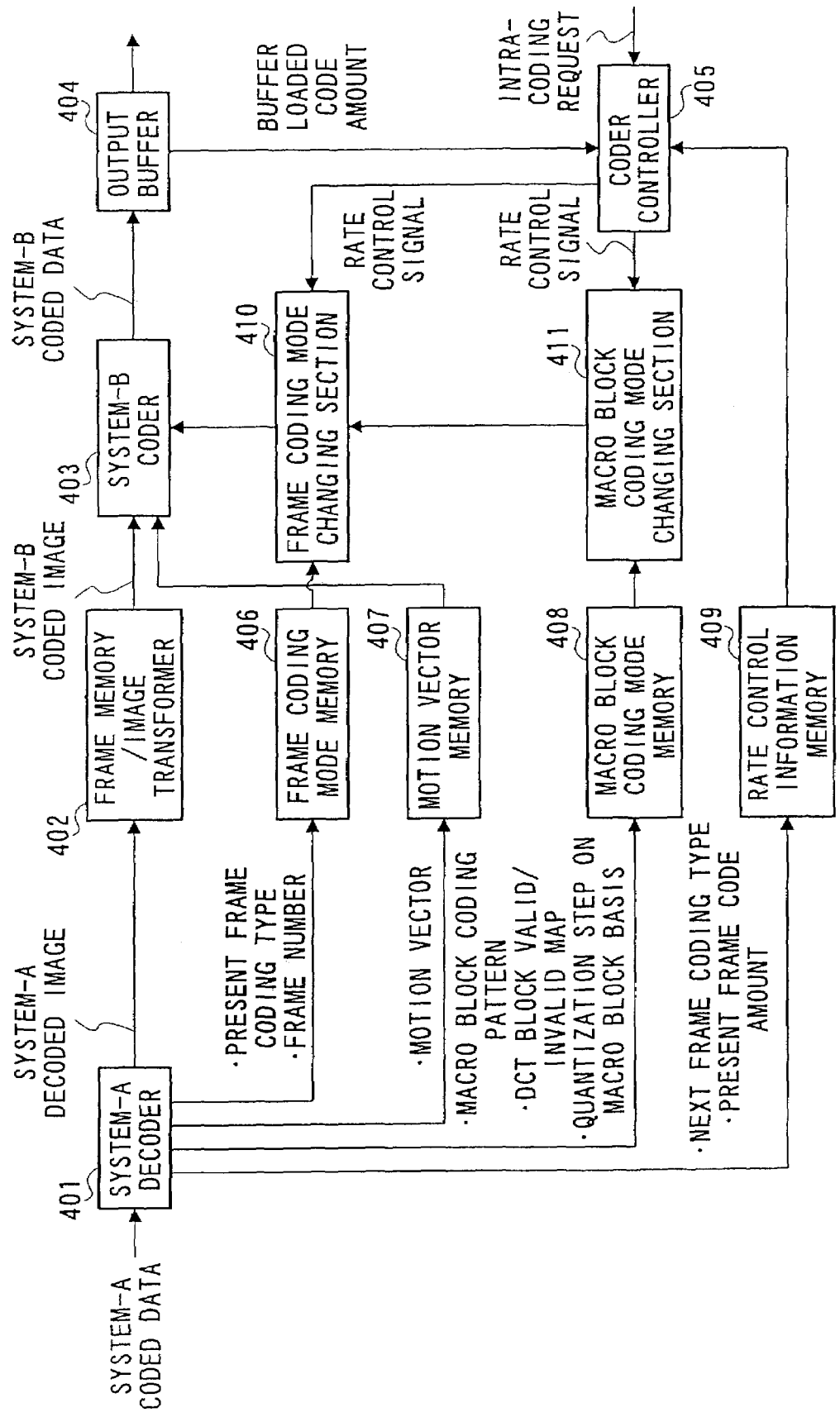
FIG. 14 is a conceptual diagram of a transcoder of the present invention.

Two embodiments for an image coding transformation apparatus are next described. FIG. 14 illustrates a conceptual diagram of a transcoder common to a third embodiment and fourth embodiment, and the method in FIG. 9 is achieved therein.

Intermediate data described in FIG. 8 is stored in frame coding mode memory 406, motion vector memory 407, macro block coding memory 408 and rate control information memory 409. Coder control section 405 achieves the control described in FIG. 9. In response to the control signal, frame coding mode changing section 410, and macro block coding mode changing section 411 each performs the change.

FIG. 14 illustrates a configuration where data of PTYPE, TR, CDi,j, CBPi,j,k, QUANTi,j, and MTYPEi,j is provided to a coder with the system B without being changed unless coder controller 405 transmits a control signal.

Figure 15:
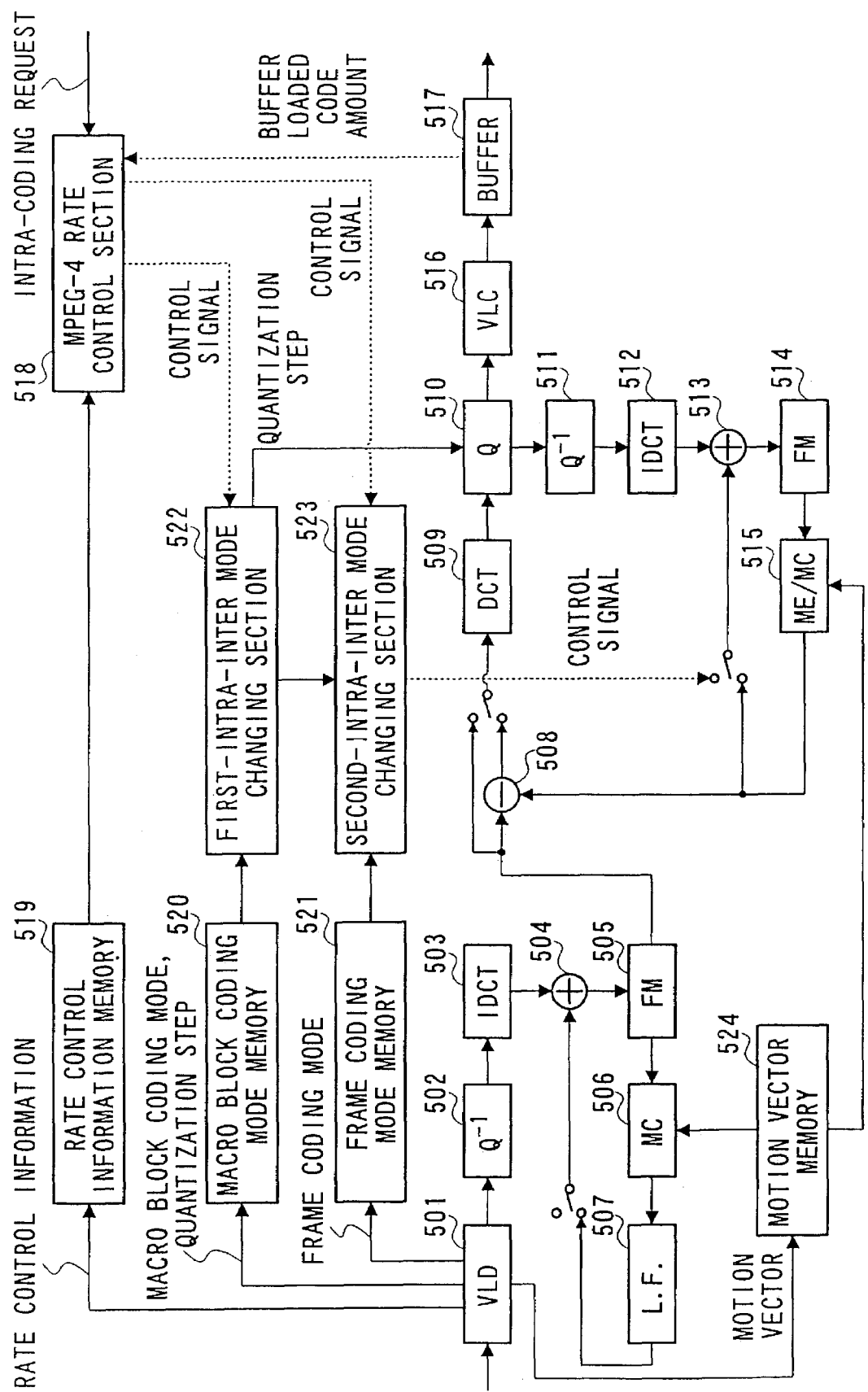
FIG. 15 is a diagram illustrating the transcoder from H.261 to MPEG-4.

The details of FIG. 14 are illustrated in FIG. 15, which illustrates an apparatus corresponding to the method of the first embodiment as a third embodiment. In FIG. 15, 501 is a variable length decoding section, 502 is an inverse quantization section that performs inverse quantization, 503 is an inverse DCT section that performs inverse DCT processing, 504 is an adder, 505 is a frame memory, 506 is a motion compensation section that performs processing for motion compensation, and 507 is a loop filter, thus composing an H.261 decoder. A decoded image is provided to a MPEG-4 coder through frame memory 505.

508 is a subtracter, 509 is a DCT section that performs DCT calculation, 510 is a quantization section that quantizes DCT coefficients, 513 is an adder, 514 is a frame memory, 515 is a motion prediction and motion compensation section that performs motion prediction and motion compensation, 516 is a variable length coding section, and 517 is an output buffer, thus composing a MPEG-4 coder.

518 is a MPEG-4 rate control section, and achieves the control described in FIGS. 9, 10 and 11. Intermediate data is stored in rate control data memory 519, macro block coding mode memory 520, and frame coding mode memory 521. The MPEG-4 coder is controlled, while receiving the data of PTYPE, TR, CDi,j, CBPi, j, k, QUANTi,j and MTYPEi, j among the intermediate data. More specifically, block mode changing section 522 changes the coding mode of a macro block, and the intra-inter mode changing section controls the predictive coding based on the data of PTYPE and MTYPE.

In addition, mode data is multiplexed in variable length coding section 516 to be output to an output buffer, which is not shown in the figure to be simplified.

Figure 16:
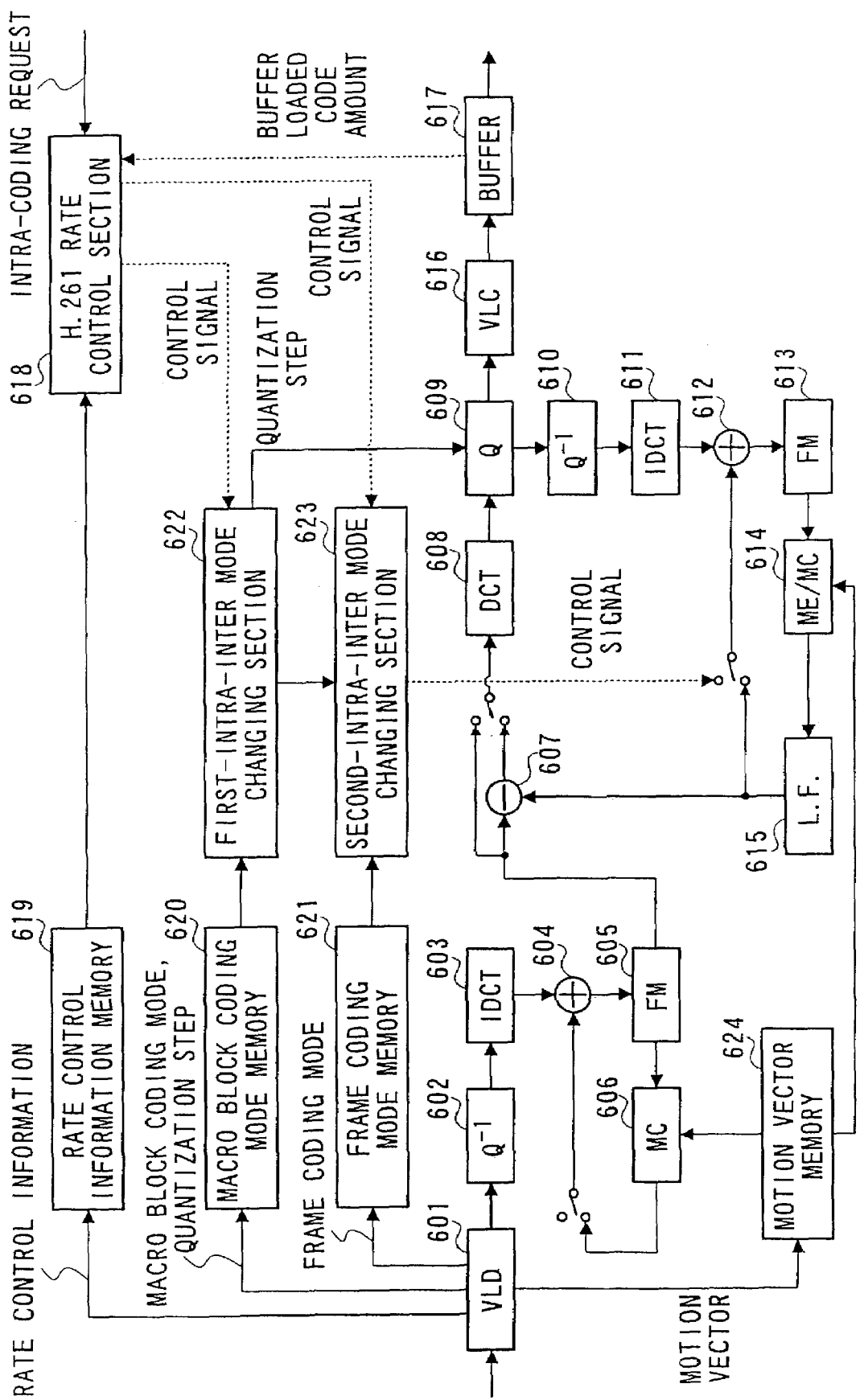
FIG. 16 is a diagram illustrating the transcoder from MPEG-4 to H.261.

A fourth embodiment is next explained with FIG. 16.

An apparatus of the fourth embodiment performs the transformation from MPEG-4 to H.261, inversely to the apparatus of the third embodiment. In FIG. 16, 601 is a variable length decoding section, 602 is an inverse quantization section, 603 is an inverse DCT section, 604 is an adder, 605 is a frame memory, and 606 is a motion compensation section, thus composing a MPEG-4 decoder.

A decoded image is provided to an H.261 coder through frame memory 605.

607 is a subtracter, 608 is a DCT section, 609 is a quantization section, 610 is an inverse quantization section, 611 is an inverse quantization section, 612 is an adder, 613 is a frame memory, 614 is a motion prediction and motion compensation section, 615 is a loop filter, 616 is a variable length coding section, and 617 is an output buffer, thus composing the H.261 coder. 618 is an H.261 rate control section, and achieves the control described in FIGS. 9, 12 and 13. Intermediate data is stored in rate control data memory 619, macro block coding mode memory 620, and frame coding mode memory 621. The H.261 coder is controlled, while receiving the data of PTYPE, TR, CDi,j, CBPi,j,k, QUANTi,j and MTYPEi,j among the intermediate data. More specifically, block mode changing section 622 changes the coding mode of a macro block, and the intra-inter mode changing section controls the predictive coding based on the data of PTYPE and MTYPE. In addition, mode data is multiplexed in variable length coding section 623 to be output to an output buffer, which is not shown in the figure to be simplified.

Two embodiments for the image coding transformation methods as described in claims 6 to 10 are as described above.

The scope of the present invention includes computer program products that are recording media in which a program, loadable with a computer, for achieving the present invention is stored. The recording media include discs such as a floppy disc, optical disc, CD-ROM and magnetic disc, ROM, RAM, ERROM, EEPROM, and magnetic or optical card. The present invention is, however, not to limited to such media in particularly. Further, it may be possible to record the program in a recording medium to transfer to a worldwide terminal, or forward the program (distribute with encryption) via a communication channel such as the internet, thereby achieving the present invention in a computer and portable information terminal.

The present invention is not limited to the above described embodiments, and various variations and modifications may be possible without departing from the scope of the present invention.

This application is based on the Japanese Patent Application No.HEI11-047613 filed on Feb. 25, 1999, entire content of which is expressly incorporated by reference herein.

What is claimed is:

1. A method for transforming a first data sequence, generated by a first moving picture coding system that switches an intra-frame coding mode and an inter-frame coding mode on a block unit basis, to a second data sequence, generated by a second moving picture coding system that switches an intra-frame coding mode and an inter-frame coding mode on the block unit basis, the method comprising:
   increasing a number of blocks to be coded by the intra-frame coding mode in the second moving picture coding system when a generated code amount of the second data sequence is less than a target value;
   recording a code amount on the block unit basis in reading data from the first data seguence; and
   using a value obtained by multiplying the code amount recorded on the block unit basis by a factor, as the target value of the generated code amount of the second data sequence.

2. The method according to claim 1, further comprising:
   acquiring a quantization scale used in quantizing data in said first moving picture coding system when said data is read from said first data sequence; and
   changing a quantization scale in said second moving picture coding system to an integer multiple of the acquired quantization scale when said generated code amount of said second data sequence is adjusted in coding a present frame by said second moving picture coding system.

3. The method according to claim 1, wherein said block unit includes one of a frame and a macro block.

4. The method according to claim 1, further comprising:
   redefining a luminance variance of a motion compensated inter-block differential so that the intra-frame coding mode is selected more than the inter-frame coding mode, to increase the number of blocks to be coded by the intra-frame coding mode.

5. The method according to claim 1, further comprising:
   shortening a period of intra-refreshing of a macro block belonging to a moving region to increase the number of blocks to be coded by the intra-frame coding mode.

6. An apparatus for transforming a first data sequence, generated by a first moving picture coding system that switches an intra-frame coding mode and an inter-frame coding mode on block unit basis to a second data sequence, generated by a second moving picture coding system that switches an intra-frame coding mode and an inter-frame coding mode on the block unit basis, said apparatus comprising:
   a block increaser configured to increase a number of blocks to be coded by the intra-frame coding mode in the second moving picture coding system when a generated code amount of the second data sequence is less than a target value;
   a recorder configured to record a code amount on the block unit basis in reading data from the first data sequence; and
   a determiner configured to determine the target value of the generated code amount of the second data sequence based on a value obtained by multiplying the code amount recorded on the block unit basis by a factor.

7. The apparatus according to claim 6, further comprising:
   an acquirer configured to acquire a quantization scale used in quantizing data in the first moving picture coding system when the data is read from the first data sequence; and
   a changer configured to change a quantization scale in the second moving picture coding system to an integer multiple of the acquired quantization scale when the generated code amount of the second data sequence is adjusted in coding a present frame by the second moving picture coding system.

8. The apparatus according to claim 6, wherein the block unit comprises one of a frame and a macro block.

9. The apparatus according to claim 6, wherein a luminance variance of a motion compensated inter-block differential is redefined in order to increase the number of blocks to be coded by the intra-frame coding mode.

10. The apparatus according to claim 6, wherein a period of intra-refreshing of a macro block belonging to a moving region is shortened in order to increase the number of blocks to be coded by the intra-frame coding mode.

11. A recording medium that stores a program, readable and executable by a computer, for transforming a first data sequence, generated by a first moving picture coding system, that switches an intra-frame coding mode and an inter-frame coding mode on a block unit basis to a second data sequence, generated by a second moving picture coding system that switches an intra-frame coding mode and an inter-frame coding mode on the block unit basis, the recording medium comprising:

increasing code executable to increase a number of blocks to be coded by the intra-frame coding mode in the second moving picture coding system when a generated code amount of the second data sequence is less than a target value;

recording code executable to record a code amount on the block unit basis in reading data from the first data seguence; and determining code executable to determine the target value of the generated code amount of the second data sequence based on a value obtained by multiplying the code amount recorded on the block unit basis by a factor.

12. The recording medium according to claim 11, further comprising:

acquiring code executable to acquire a quantization scale used in quantizing data in the first moving picture coding system when the data is read from the first data sequence; and changing code executable to change a quantization scale in the second moving picture coding system to an integer multiple of the acquired quantization scale when the generated code amount of the second data sequence is adjusted in coding a present frame by the second moving picture coding system.

13. The recording medium according to claim 11, wherein the block unit comprises one of a frame and a macro block.

14. The recording medium according to claim 11, further comprising;

luminance variance code executable to redefine a luminance variance of a motion compensated inter-block differential in order to increase the number of blocks to be coded by the intra-frame coding mode.

15. The recording medium according to claim 11, further comprising:

period determining code executable to shorten a period of intra-refreshing of a macro block belonging to a moving region to increase the number of blocks to be coded by the intra-frame coding mode.

* * * * *

UNITED STATES PATENT AND TRADEMARK OFFICE
CERTIFICATE OF CORRECTION

PATENT NO. : 7,292,632 B2 Page 1 of 1
APPLICATION NO. : 10/456677
DATED : November 6, 2007
INVENTOR(S) : Etoh et al.

It is certified that error appears in the above-identified patent and that said Letters Patent is hereby corrected as shown below:

At column 15, line 63 (claim 1 line 14), "seguence" should be --sequence--.

At column 17, line 13 (claim 11 line 17), "seguence" should be --sequence--.

Signed and Sealed this

Twenty-ninth Day of April, 2008

JON W. DUDAS
*Director of the United States Patent and Trademark Office*